(12) United States Patent
Szor et al.

(10) Patent No.: US 7,568,233 B1
(45) Date of Patent: Jul. 28, 2009

(54) DETECTING MALICIOUS SOFTWARE THROUGH PROCESS DUMP SCANNING

(75) Inventors: Peter Szor, Northridge, CA (US); Peter Ferrie, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 859 days.

(21) Appl. No.: 11/097,790

(22) Filed: Apr. 1, 2005

(51) Int. Cl.
*G06F 11/00* (2006.01)

(52) U.S. Cl. .............................. 726/25; 726/22; 726/23; 726/24

(58) Field of Classification Search ..................... 726/25
See application file for complete search history.

(56) References Cited

U.S. PATENT DOCUMENTS

| | | | |
|---|---|---|---|
| 6,681,348 B1* | 1/2004 | Vachon | 714/45 |
| 7,178,068 B2* | 2/2007 | Maison et al. | 714/45 |
| 7,290,175 B1* | 10/2007 | Kessler et al. | 714/37 |

OTHER PUBLICATIONS

Microsoft Press, 'Computer Dictionary,3rd edition', Microsoft Corp., 1997, p. 92, 'client/server architecture' definition.*
Wang, Y., et al, 'Detecting Stealth Software with Strider GhostBuster' Microsoft, Dec. 13, 2004, Tech Report MSR-TR-2005-25, entire document, http://ieeexplore.ieee.org/stamp/stamp.jsp?arnumber=01467811.*
Chen, E. et al., "Blended Attacks Exploits, Vulnerabilities And Buffer-Overflow Techniques In Computer Viruses," Virus Bulletin Conference, Sep. 2002, pp. 1-36, Virus Bulletin Ltd., The Pentagon, Abingdon, Oxfordshire, England.
Plachy, J., "The Portable Executable File Format," 1996, 1997, [online] [Retrieved on Mar. 14, 2005] Retrieved from the Internet<URL:http://www.cns.ul.ie/~caolan/publink/winresdump/winresdump/doc/pefile.html>.
Szor, P., "Fighting Computer Virus Attacks," Powerpoint presentation, 12 pages, Aug. 9, 2004.
Szor, P., "Memory Scanning Under Windows NT," Virus Bulletin Conference, Sep. 1999, pp. 1-22, Virus Bulletin Ltd., The Pentagon, Abingdon, Oxfordshire, England.

* cited by examiner

*Primary Examiner*—Kambiz Zand
*Assistant Examiner*—Ronald Baum
(74) *Attorney, Agent, or Firm*—Fenwick & West LLP

(57) ABSTRACT

An executable file containing malicious software can be packed using a packer to make the software difficult to detect. The executable file is loaded into the computer's memory and executed as a process. A memory dump module analyzes the address space for the process and identifies an executable file image within it. The memory dump module creates a memory dump file on the computer's storage device containing the file image and modifies the file to make it resemble a normal executable file. A signature scanning module scans the memory dump file for signatures of malicious software. If a signature is found in the file, a reporting module sends the host file for the process and the memory dump file to a security server for analysis.

20 Claims, 4 Drawing Sheets

DETECTING MALICIOUS SOFTWARE THROUGH PROCESS DUMP SCANNING

BACKGROUND OF THE INVENTION

1. Field of the Invention

This invention pertains in general to computer security and in particular to detecting computer viruses and other malicious software through signature scanning.

2. Description of the Related Art

Purveyors of malicious software such as computer viruses, worms, and spyware go to extreme lengths to keep their software from being detected. Developers of security software, in turn, constantly update their products to detect the malicious software. One common technique for detecting malicious software is signature scanning. Generally, signature scanning searches a file for a signature, such as a string of bytes, that unambiguously identifies the malicious software. When new malicious software is discovered, the developers analyze it and generate a new signature that can detect it.

Recently, malicious software purveyors have returned to an old trick for hiding their software: code packing. The purveyors use a program, called a "packer" to modify the malicious executable file so that it no longer matches its original signature. Packers have existed for a long time and have legitimate uses, such as converting the executable file into a compressed version of itself that decompresses automatically when executed. Virus purveyors first used packers in the 1980s to camouflage their software, and more recently have begun using them again. To the purveyor of malicious software, the main advantage of using a packer is that it allows older software to evade detection. It is easier for a purveyor to pack an old virus with one or more packers than to write a completely new virus.

The security software can use signature scanning to identify malicious software that is packed by some packers. However, packers can be modified to evade detection just like other software. Moreover, some scanning techniques that work well on unpacked malicious software, such as emulation, do not always work on packed software. Packed software can require a long time to emulate before the telltale signature becomes apparent. Further, the packer can defeat emulation by utilizing unsupported instructions or more memory than the emulator provides.

Using packers thus allows purveyors of malicious software to gain the upper hand in the battle with security software developers. Security software that can detect an unpacked version of malicious software might not detect the packed version. Moreover, even if the security software detects one packed version, it is likely to miss the same malicious software packed with a different packer.

As a result, there is a need in the art for a way to detect packed malicious software that does not suffer from the above-mentioned deficiencies.

BRIEF SUMMARY OF THE INVENTION

The above need is met by a client security module that detects packed malicious software by analyzing an executable file image created by an executing process. An executable file that contains packed malicious software is executed by a computer as a process. During execution, the process unpacks itself and creates an executable file image in its address space. A memory dump module analyzes the address space and identifies an executable file image within it. The memory dump module creates a memory dump file containing the file image on the computer's storage device and modifies it to make the file resemble a normal executable file. A signature scanning module scans the memory dump file for signatures of malicious software. If a signature is found in the file, a reporting module sends the host file for the process and the memory dump file to a security server for analysis.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
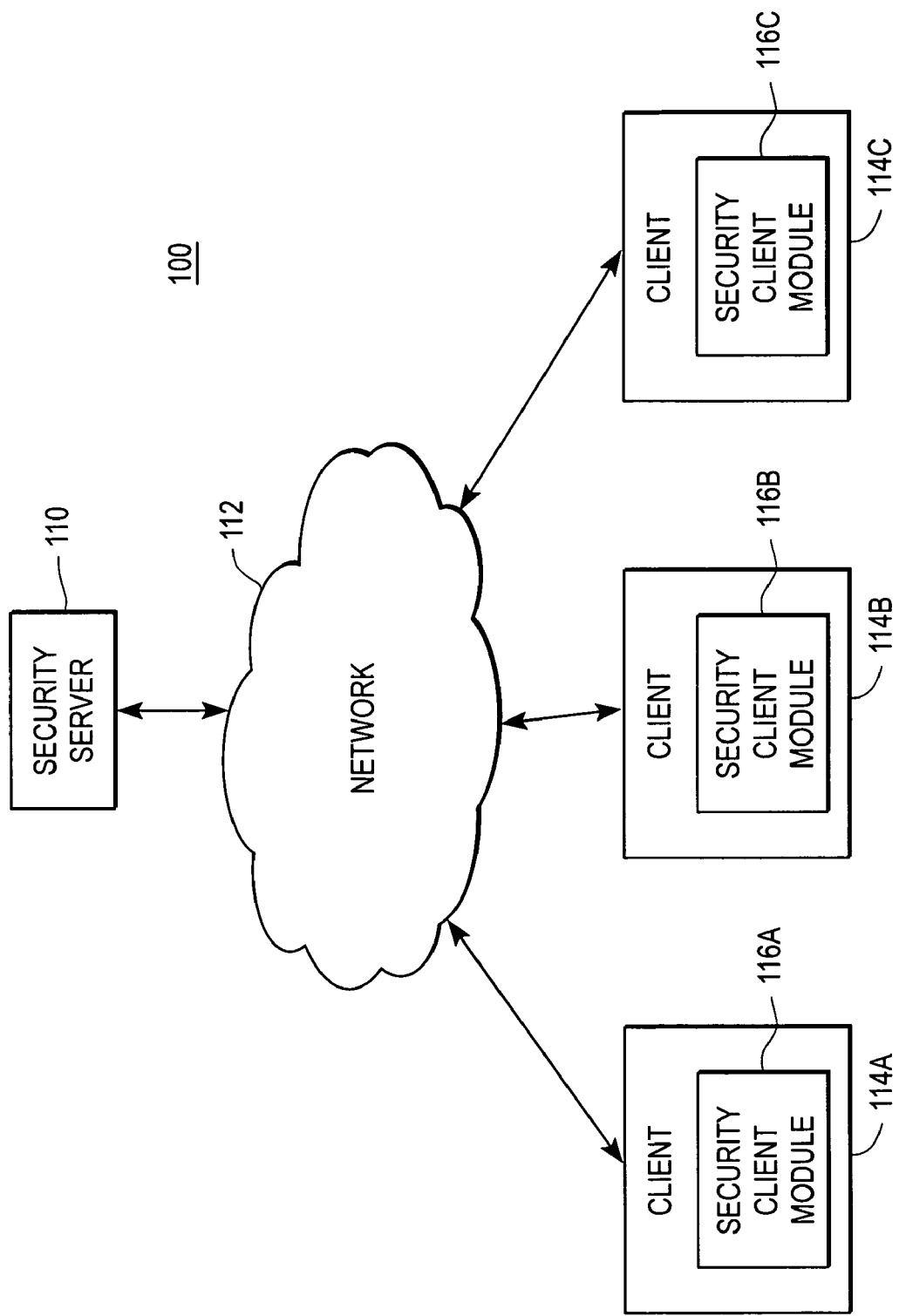
FIG. 1 is a high-level block diagram of a computing environment according to one embodiment of the present invention.

FIG. 1 is a high-level block diagram of a computing environment 100 according to one embodiment of the present invention. FIG. 1 illustrates a security server 110 connected to a network 112. The network 112 is also connected to multiple client computers 114. FIG. 1 and the other figures use like reference numerals to identify like elements. A letter after a reference numeral, such as "114A," indicates that the text refers specifically to the element having that particular reference numeral. A reference numeral in the text without a following letter, such as "114," refers to any or all of the elements in the figures bearing that reference numeral (e.g. "114" in the text refers to reference numerals "114A," "114B," and/or "114C" in the figures).

The network 112 provides communications between and among the other entities illustrated in the computing environment 100 of FIG. 1. In one embodiment, the network 112 is the Internet and uses wired and/or wireless links. The network 112 can also utilize dedicated or private communications links that are not necessarily part of the Internet. The entities illustrated in FIG. 1 use conventional communications technologies such as the transmission control protocol/Internet protocol (TCP/IP) to communicate over the network 112. The entities of FIG. 1 also use conventional communications protocols such as the hypertext transport protocol (HTTP), the simple mail transfer protocol (SMTP), the file transfer protocol (FTP), etc. The entities can also engage in secure communications using technologies including the secure sockets layer (SSL), Secure HTTP and/or virtual private networks (VPNs). The communicated messages utilize conventional data encodings such as hypertext markup language (HTML), extensible markup language (XML), etc. In one embodiment, all or part of the network 112 includes non-electronic links. For example, the security server 110 may communicate with the client computer 114 via U.S. mail, etc.

The security server 110 is provided by a security software vender or other entity. The security server 110 can include one or more standard computer systems configured to communicate with client computers 114 via the network 112. For example, the security server 110 can include a web server, FTP server, or other technology that enables the security server 110 to interact with the client computers 114 via the network 112. In one embodiment, the security server 110 provides signatures for detecting malicious software to the client computers 114.

The client computer 114 is an electronic device that can host a computer virus, worm, or other forms of malicious software. In one embodiment, the client computer 114 is a conventional computer system executing, for example, a Microsoft Windows-compatible operating system (OS), Apple OS X, and/or a Linux distribution. In another embodiment, the client computer 114 is another device having computer functionality, such as a personal digital assistant (PDA), cellular telephone, video game system, etc. The client computer 114 typically stores numerous computer files that can host malicious software. Although only three client computers 114 are shown in FIG. 1, embodiments of the present invention can have thousands or millions of such clients.

Malicious software, sometimes called "malware," is generally defined as software that executes the client computer 114 surreptitiously or that has some surreptitious functionality. Malicious software can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements. The executable file that hosts the malicious software can be modified with one or more packers in order to make the malicious software difficult to detect.

The client computer 114 executes a security client module 116 for detecting the presence of malicious software. The security module 116 can be, for example, incorporated into the OS of the computer or part of a separate comprehensive security package. In one embodiment, the security client module 116 is provided by the entity that operates the security server 110. The security client module 116 can communicate with the security server 110 via the network 112 in order to download the signatures and/or other information utilized to detect malicious software. In an embodiment described here, the security client module 116 can detect malicious software that has been modified with a packer by dumping a portion of a process's memory space to a file and analyzing that file.

Figure 2:
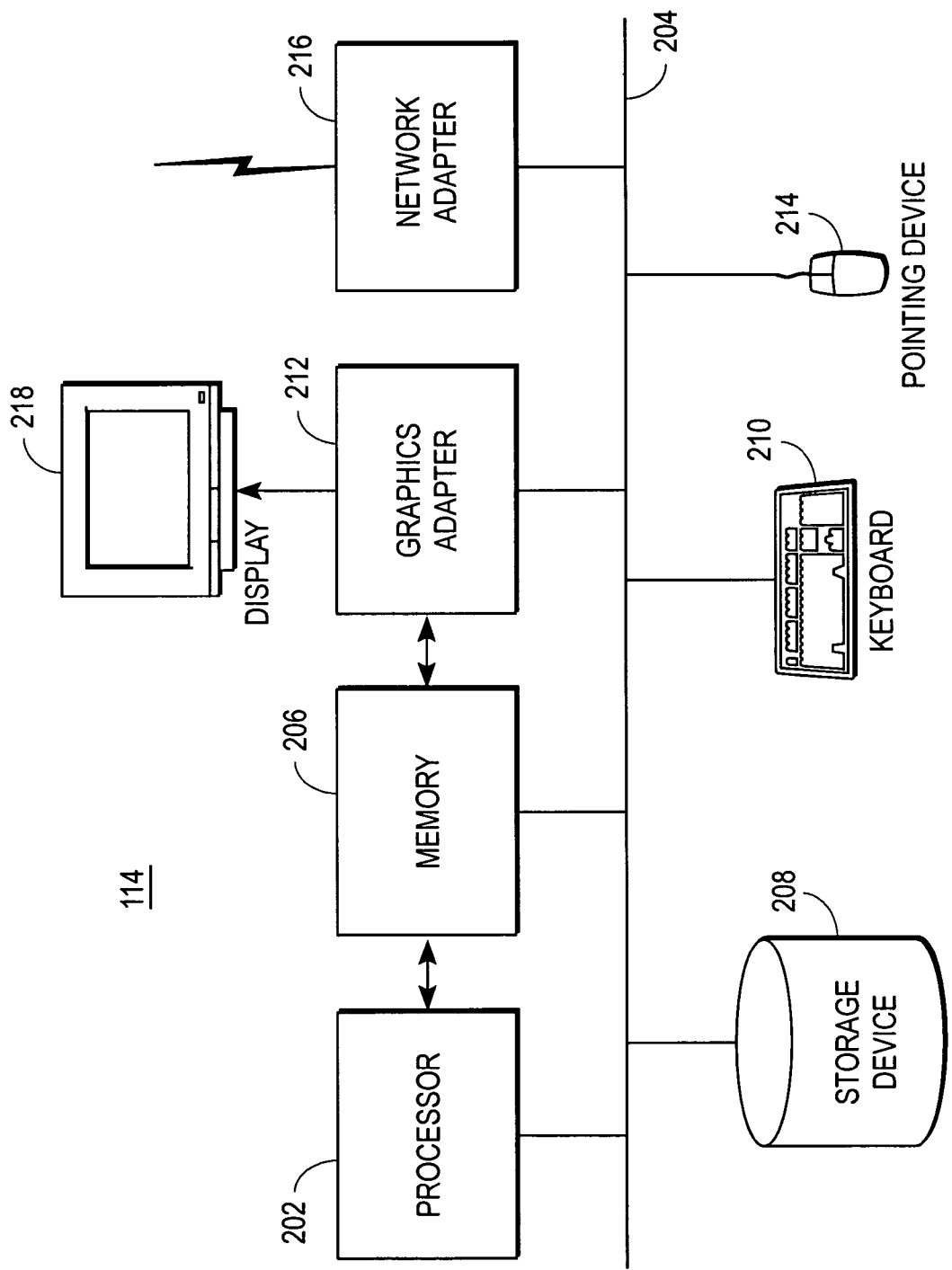
FIG. 2 is a high-level block diagram illustrating a functional view of a typical client computer according to one embodiment of the present invention.

FIG. 2 is a high-level block diagram illustrating a functional view of a typical client computer 114 according to one embodiment of the present invention. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 114. The graphics adapter 212 displays images and other information on the display 218. The network adapter 216 couples the computer 114 with the network 112.

The storage device 208 is a hard disk drive in one embodiment but can also be any other device capable of storing data, such as a writeable compact disk (CD) or DVD, and/or a solid-state memory device. As is known in the art, the storage device 208 holds multiple files containing executable code and/or data. The computer 114 can load an executable file into memory 206 and execute it using the processor 202. An executable file that is loaded into memory 206 for execution is referred to as a "process." The file on the storage device 208 from which the process was loaded is said to "host" the process.

In one embodiment, at least some of files stored on the storage device 208 are in the MICROSOFT WINDOWS Portable Executable (PE) format. Typically, a PE file is of type .EXE, indicating that the file is an executable file, or .DLL, indicating that the file is a dynamic link library (DLL) that can be executed by other files. The PE file header holds a data structure containing fields that provide basic information about the file. One such field is BaseOfImage, which describes the preferred base address in the address space of the process to which the OS should map the executable file image. Another field is SizeOfImage, which indicates the amount of memory in the process's address space to reserve for the loaded executable image. Other file formats, such as those utilized by APPLE MACINTOSH and Linux-based computers usually contain similar information.

The computer 114 is adapted to execute computer program modules for providing functionality described herein. In this description, the term "module" refers to computer program logic for providing the specified functionality. A module can be implemented in hardware, firmware, and/or software. It will be understood that the modules described herein represent one embodiment of the present invention. Certain embodiments may include other and/or different modules. In addition, the embodiments may lack modules described herein and/or distribute the described functionality among the modules in a different manner. In one embodiment, the modules are stored on the storage device 208 as executable files, loaded into the memory 206, and executed by the processor 202 as one or more processes.

Figure 3:
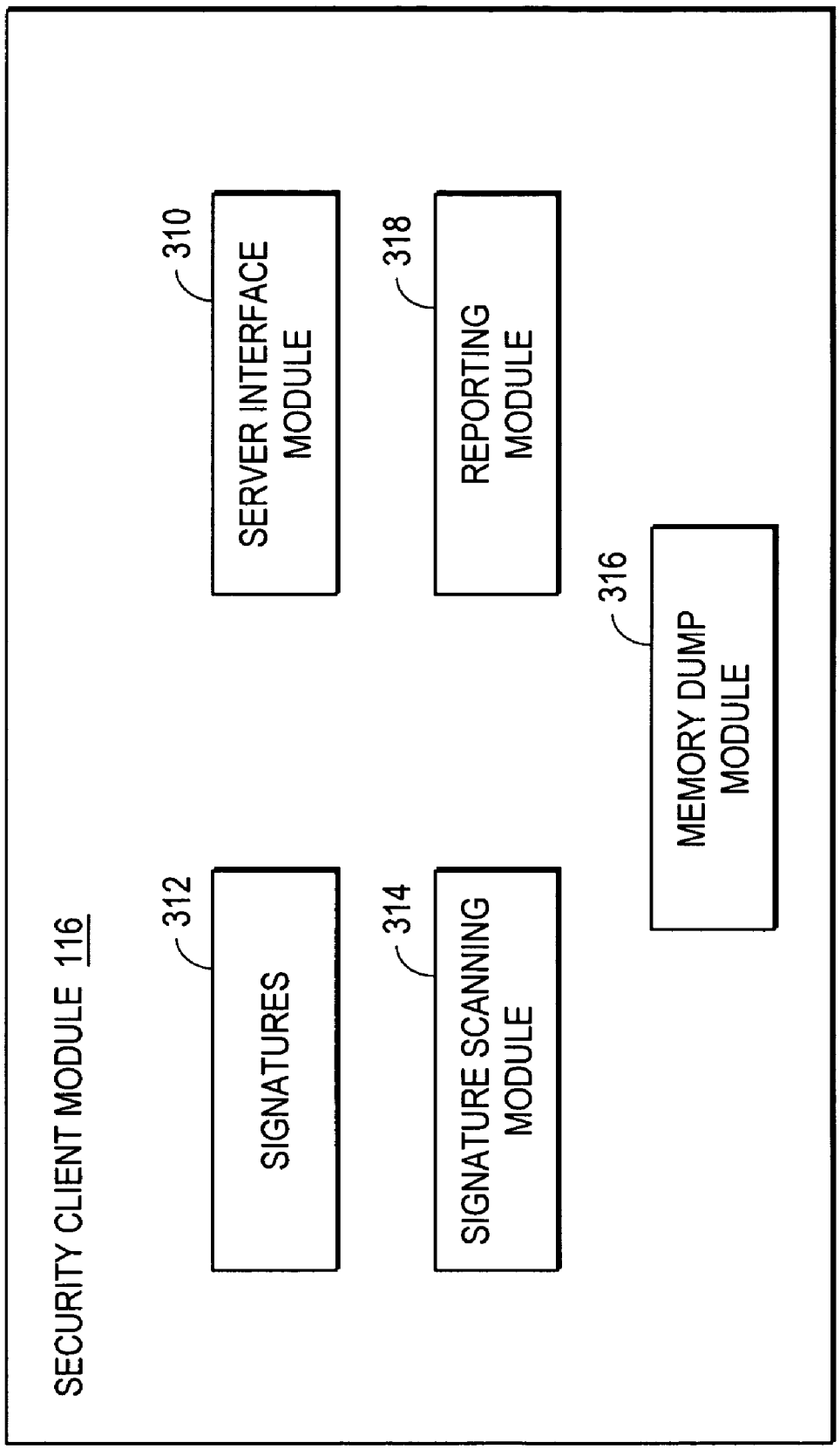
FIG. 3 is a high-level block diagram illustrating modules within the security client module according to one embodiment.

FIG. 3 is a high-level block diagram illustrating modules within the security client module 116 according to one embodiment. A server interface module 310 provides communication between the security client module 116 and the security server 110 via the network 112. In one embodiment, the server interface module 310 retrieves signatures of malicious software from the server 110 and provides memory dump and host files to the server 110.

A signatures module 312 stores signatures for identifying malicious software on the client computer 114. In one embodiment, the signatures in the signatures module 312 contain strings, instruction usage records and/or other data that can be used to uniquely identify specific types of malicious software. For example, a signature can contain a specific sequence of values that are found in only a particular virus. If a file on the storage device 208 of the client computer 114 has the sequence of values, then that file is infected with the virus. The signatures are designed to be utilized with executable files, such as those in the WINDOWS PE format, and with other types and formats of files that might contain malicious software.

A signature scanning module 314 scans files on the storage device 208 for the presence of the signatures in the signatures module 312. In one embodiment, the signature scanning module 314 analyzes a file to identify its potential entry points and other locations likely to contain malicious software. The module 314 scans these likely locations to determine whether they contain a signature from the signatures module 312. In one embodiment, the signature scanning module 314 performs additional analysis of the file, such as emulating instructions of the file within a virtual machine and then scanning the memory of the virtual machine for matching signatures.

A memory dump module 316 creates a file on the storage device 208 containing selected portions of a process's address space. In another embodiment, the memory dump module 316 creates the file at a different location, such as on a virtual drive in the memory 206. For packed malicious software, the module 316 performs the memory dump after the packer has unpacked the software. As a result, the dump file resembles the unpacked version of the host file for the malicious software. The signature scanning module 314 can thus be used to scan the memory dump for the signatures in the signatures module 312.

In most types of client computers 114 and operating systems, each process is executed in its own large, contiguous virtual address space. Rather than dump the entire address space of the process to the storage device 208, the memory dump module 316 dumps only the portion of the address space containing the executable file image. In one embodiment, the memory dump module 316 analyzes the BaseOfImage and SizeOfImage fields from the PE header to determine the memory address range that contains the executable file image. This header data can be obtained, for example, through the NTQuerySystemInformation( ) API for WINDOWS NT-based operating systems (such as WINDOWS NT/2000/XP) and the CreateToolhelp32Snapshot( ), Process32First( ) and Process32Next( ) APIs for versions of WINDOWS other than NT (such as WINDOWS 9×/Me, WINDOWS 2000/XP and WINDOWS SERVER 2003). Other operating systems provide similar access to this information. The memory dump module 316 stores the contents of the determined memory address range (base address+size) in the storage device 208 as the dump file.

Some packers modify the files and/or operating system memory structures so that the operating system returns inaccurate information to the memory dump module 316 in response to the API calls. To combat this technique, the memory dump module 316 can perform secondary checks to verify that it has accurately determined the size of the executable file image. In one embodiment, the memory dump module 316 verifies the size of the file image if the operating system reports that the image size is the smallest allowable size (e.g., 4096 bytes), or a slightly larger value. The memory dump module 316 can also verify the size in other situations.

The memory dump module 316 verifies the size of the executable file image by checking for pages of memory that contain file data. In a Windows-specific embodiment, the memory dump module 316 uses the VirtualQueryEx( ) API for this check. This API returns flags that describe the memory region, including a MEM_COMMIT flag that indicates whether the memory region contains file data. The memory dump module 316 starts at the base address of the executable file image and calls this API to query for information about sequential memory regions, until the MEM_COMMIT flag is cleared. The region having the cleared flag marks the end of the file data. Thus, the regions from the base address up to the one prior to the region having the cleared flag are dumped to the storage device 208.

In one embodiment, the memory dump module 316 modifies the dump file to make it more closely resemble the unpacked executable file. A PE file has a SectionHeader structure containing headers for the various sections of the file. Each section header contains SizeOfRawData and PointerToRawData fields that respectively indicate the size of the section body and the location of the section body in the file. Likewise, each header includes VirtualSize and VirtualAddress fields that indicate the same information once the file is loaded into a virtual address space. In one embodiment, the memory dump module 316 sets the SizeOfRawData field equal to the VirtualSize field and the PointerToRawData field equal to the VirtualAddress field for each section in the file. This step makes the memory dump file resemble a normal executable file and allows the signature scanning module 314 to scan the dump file as if it were a normal file.

A reporting module 318 reports the outcome of the scan of the memory dump file performed by the signature scanning module 314. In one embodiment, if the signature scanning module 314 identifies a signature in the dump file, the reporting module 318 provides a dialog box or other notification to an end-user of the client computer 114 indicating that the dump file contains malicious software. The reporting module 318 can also perform other actions, such as quarantining the malicious software, removing the entry points that allowed the malicious software to execute, and/or removing the software from the client computer 114.

Figure 4:
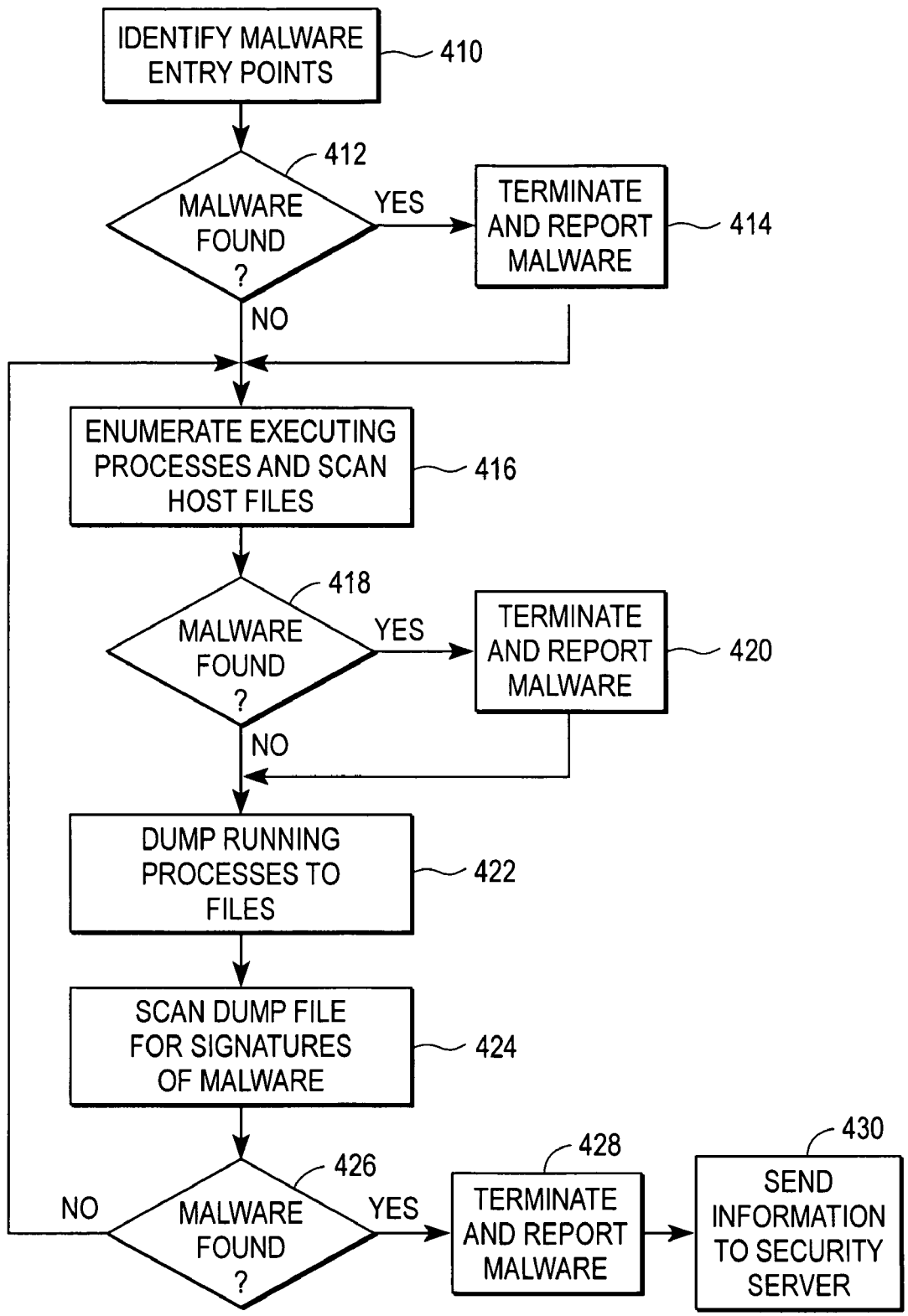
FIG. 4 is a flow chart illustrating the operation of the security client module according to one embodiment.

In one embodiment, the reporting module 318 sends the dump file, the file that hosted the dumped process, and the identity of the matching signature to the security server 110. Analysts associated with the security server 110 analyze this information and create improved countermeasures aimed at detecting and stopping the malicious software. In one embodiment, the result of the analysts' work is returned to the client computers 114 in the form of new signatures and/or improvements to the signature scanning module 314. Since the reporting module 318 provides the dump file to the security server 110 along with the host file, the analysts do not need to spend time testing the host file to recreate the dump file that triggered the malicious software detection;

FIG. 4 is a flow chart illustrating the operation of the security client module 116 according to one embodiment. Those of skill in the art will recognize that other embodiments can perform other and/or different steps than described here. In addition, the steps can be performed in different orders.

The security client module 116 identifies 410 the possible malicious software entry points present on the client computer 114. These entry points represent ways that the malicious software can start executing on the computer 114. For example, in computers running WINDOWS, potential entry points include the "Startup" folder and certain locations in the registry. Software referenced at these entry points is automatically executed when the computer is booted. The security client module 116 scans the files of the software referenced at the potential entry points for signatures of malicious software. If 412 the security client module 116 finds a file containing malicious software, it terminates any processes spawned from that file, removes the entry point, and reports 414 the presence of the malicious software.

The security client module 116 enumerates 416 the processes that are executing on the client computer 114. The security client module 116 scans 416 the files that host each executing process for signatures of malicious software. If a file hosting malicious software is encoded using a packer, this scan might fail to detect the malicious software. If 418 the security client module 116 detects malicious software, it terminates the corresponding process, removes the software's entry points from the client computer 114, and reports 420 its presence.

In order to detect any malicious software encoded using a packer, the security client module 116 dumps 422 the executable file images of the running processes to files on the storage device 208. In one embodiment, a process is dumped to a file at a predetermined time period after the process is initially executed. This time period, e.g. 3-5 seconds, is intended to give the packer an opportunity to unpack the malicious software before the dump is performed. One issue with using a predetermined time period is that the malicious software can evade detection by waiting a longer period, e.g. 10 seconds, before unpacking the malicious software. Therefore, in another embodiment the executable file image is dumped to a file after a random time period. The random time period is calculated from when the process initially executed or from some other point. In one embodiment, the random time period has an upper bound in order to limit the damage that the malicious software can perform before it is detected. In another embodiment, a process is dumped to a file upon the occurrence of a specified event. For example, the process can be dumped after it makes API calls that are likely to be used by malicious software, such as calls that open a file on the storage device 208 or utilize network resources.

For each executable file image dumped 422 to a file, the security client module 116 scans 424 the file for signatures of malicious software. Depending upon the embodiment and/or the file, the scanning can involve examining the file for possible malicious software entry points, emulating instructions in the file, and other techniques that might make a signature evident. In one embodiment, if 426 no malicious software is found in the dumped files, the security client module 416 continues to protect the client computer by monitoring for new processes and subjecting them to the same examination.

If 426 malicious software is found in a dumped file, the security client module 116 terminates 428 the corresponding process and removes its entry points to prevent it from performing malicious actions or executing again. The security client module 116 also reports 428 the detection. One embodiment of the security client module 116 sends 430 the dump file and the file that hosted the dumped process to the security server 110. Analysts associated with the security server 110 analyze the dump and host files and generate countermeasures for the malicious software. These countermeasures are distributed to the security client modules 116 through the security server 110.

Those of skill in the art will recognize that the various steps of FIG. 4 can be performed in parallel and/or in different orders as new processes are initiated on the client computer 114, malicious software is detected, new signatures are received, etc. Taken together, these steps provide comprehensive security to the client computer 114.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A system for detecting malicious software on a computer executing a process, comprising:
   a computer-readable storage medium storing executable computer program modules comprising:
      a signature module adapted to
         hold signatures identifying malicious software;
      a memory dump module adapted to
         create a memory dump containing
            an executable file image
               based on the process;
      a signature scanning module adapted to
         determine whether
            the memory dump includes
               a signature held by the signature module; and
      a reporting module adapted to
         report an outcome of
            the determination to
               an end-user of the computer; and
   a processor
      for executing the computer program modules.

2. The system of claim 1, further comprising:
   a server interface module adapted to
      interact with
         a security server
            via a network; and
   wherein the reporting module is
      in communication with the server interface module and
         further adapted to
         provide the memory dump to
            the security server.

3. The system of claim 1, wherein the process executes in an address space and wherein the memory dump module is further adapted to:
   determine a memory region in the process's address space containing the executable file image; and
   create the memory dump responsive to the determined memory region.

4. The system of claim 1, wherein the computer is executing an operating system and wherein the memory dump module is further adapted to:
   query the operating system for information describing a memory range containing the executable file image; and
   determine whether the information describing the memory range is suspicious.

5. The system of claim 4, wherein the process executes in an address space and wherein the memory dump module is further adapted to:
   analyze the process's address space to determine the memory range containing the executable file image responsive to a determination that the information describing the memory range is suspicious.

6. The system of claim 1, wherein the memory dump module is further adapted to:
   alter the memory dump to make it resemble an executable file.

7. A method for detecting malicious software on a computer executing a process in an address space, comprising:
   determining a memory range
      in the address space of the process containing
         an executable file image;
   creating a memory dump of
      the executable file image;
   determining whether
      the memory dump includes
         a signature identifying malicious software; and
   reporting an outcome of
      the determination to
         an end-user of the computer.

8. The method of claim 7, further comprising:
   providing the memory dump to a security server for subsequent analysis.

9. The method of claim 7, wherein the computer is executing an operating system and wherein determining a memory range comprises:
   querying the operating system for information describing the memory range containing the executable file image; and
   determining whether the information describing the memory range is suspicious.

10. The method of claim 9, further comprising:
analyzing the process's address space to determine the memory range containing the executable file image responsive to a determination that the information describing the memory range is suspicious.

11. The method of claim 7, wherein creating a memory dump further comprises:
altering the memory dump to make it resemble an executable file.

12. The method of claim 7, wherein creating a memory dump further comprises creating the memory dump at a random time period after the process begins executing.

13. The method of claim 7, wherein creating a memory dump further comprises creating the memory dump at a predetermined time period after the process begins executing.

14. The method of claim 7, wherein creating a memory dump further comprises creating the memory dump responsive to an action performed by the process.

15. A computer program product having a computer-readable medium having computer program code embodied therein for detecting malicious software on a computer executing a process, the computer program code comprising:
a signature module adapted to
hold signatures identifying malicious software;
a memory dump module adapted to
create a memory dump containing
an executable file image
based on the process;
a signature scanning module adapted to
determine whether
the memory dump includes
a signature held by the signature module; and
a reporting module adapted to
report an outcome of
the determination to
an end-user of the computer.

16. The computer program product of claim 15, further comprising:
a server interface module adapted to
interact with
a security server
via a network; and
wherein the reporting module is
in communication with the server interface module and further adapted to
provide the memory dump to
the security server.

17. The computer program product of claim 15, wherein the process executes in an address space and wherein the memory dump module is further adapted to:
determine a memory region in the process's address space containing the executable file image; and
create the memory dump responsive to the determined memory region.

18. The computer program product of claim 15, wherein the computer is adapted to execute an operating system and wherein the memory dump module is further adapted to:
query the operating system for information describing a memory range containing the executable file image; and
determine whether the information describing the memory range is suspicious.

19. The computer program product of claim 18, wherein the process executes in an address space and wherein the memory dump module is further adapted to:
analyze the process's address space to determine the memory range containing the executable file image responsive to a determination that the information describing the memory range is suspicious.

20. The computer program product of claim 15, wherein the memory dump module is further adapted to:
alter the memory dump to make it resemble an executable file.

* * * * *